W. T. BOVIE.
DIRECT READING POTENTIOMETER.
APPLICATION FILED JUNE 19, 1916.
1,265,421.
Patented May 7, 1918.
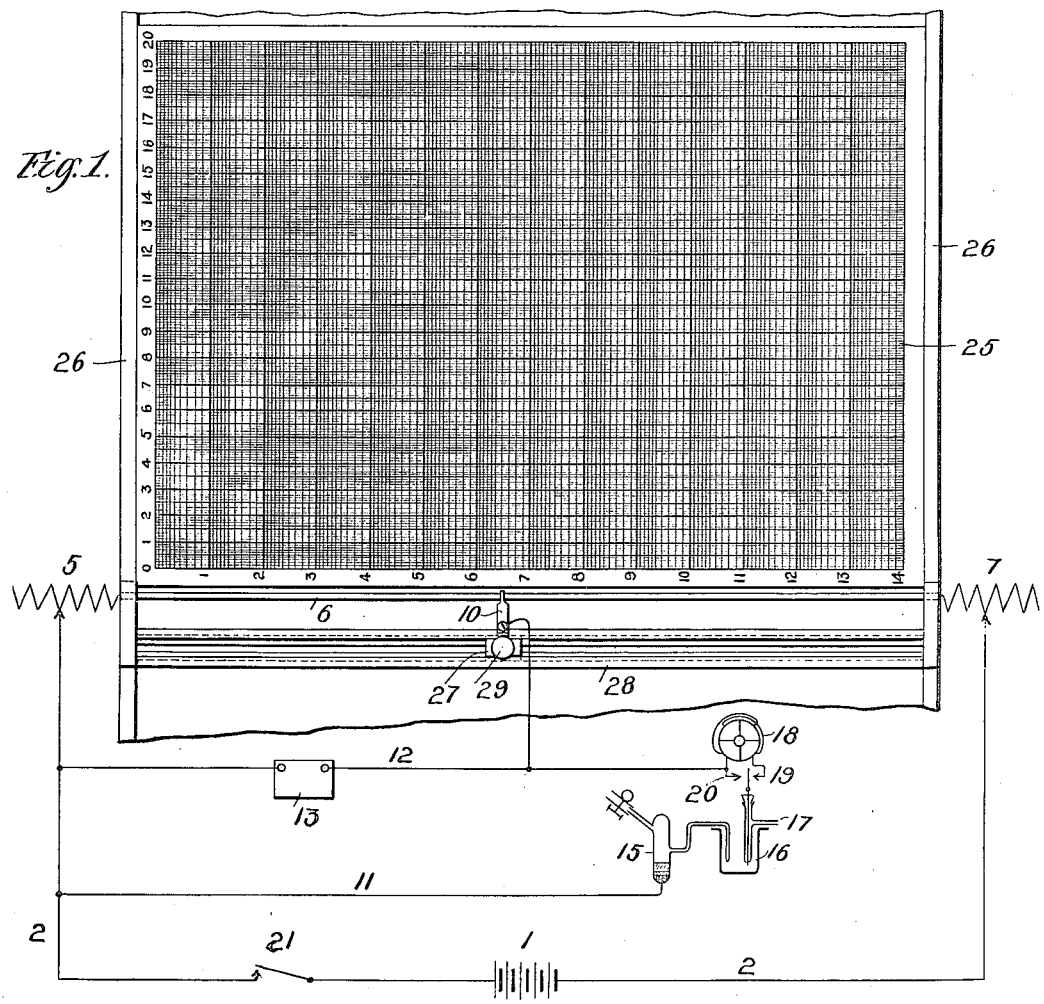
Fig. 1.
Fig. 2.
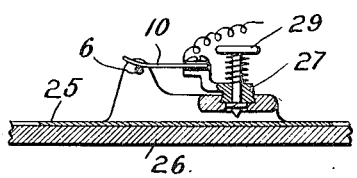
Inventor
William T. Bovie
by his attorneys
Phillips Van Everen Fish

UNITED STATES PATENT OFFICE.

WILLIAM T. BOVIE, OF BOSTON, MASSACHUSETTS.

DIRECT-READING POTENTIOMETER.

1,265,421.     Specification of Letters Patent.     Patented May 7, 1918.

Application filed June 19, 1916. Serial No. 104,404.

*To all whom it may concern:*

Be it known that I, WILLIAM T. BOVIE, a citizen of the United States, residing at Roxbury, Boston, in the county of Suffolk and State of Massachusetts, have invented certain new and useful Improvements in Direct-Reading Potentiometers; and I do hereby declare the following to be a full, clear, and exact description of the invention, such as will enable others skilled in the art to which it appertains to make and use the same.

The present invention relates to a method of and apparatus for measuring the ionic concentrations in solutions.

In determining the reaction of certain solutions it is not feasible to employ indicators, either because of the natural color of the solutions or because of their peculiar chemical constitution, or for other reasons which would render the results of such methods unreliable.

It is well recognized that changes in the concentration of ions in a solution follow changes in the reaction of the solution according to certain definite and predetermined laws, and accordingly it is an object of the present invention to utilize, according to an improved method, the changes in the concentration of the ions to measure directly the reaction of the solution.

A further object of the invention is to provide an apparatus for measuring directly the reaction of a solution by determining the changes in potential between suitable electrodes caused by changes in the concentration of ions in the solution.

In the accompanying drawings, Figure 1 illustrates diagrammatically a preferred form of apparatus employed in connection with the present invention, and Fig. 2 is a detail of recording device.

The illustrated embodiment of the invention is employed for measuring the acidity or alkalinity of a solution according to the hydrogen ion concentration. In order to measure this variation in potential a hydrogen electrode is employed in connection with a calomel electrode and the difference in potential between the two electrodes is measured. In order to obtain a clear understanding of the construction and operation of the apparatus it may be well to discuss the relation of the reaction of a solution to its hydrogen ion concentration. Pure distilled water dissociates into hydrogen and hydroxyl ions and the extent of this dissociation is such that in one liter of water at normal temperature there is approximately $\frac{1}{10,000,000}$ of a gram of hydrogen ions. In other words, the concentration of hydrogen ions is $\frac{1}{10,000,000}$ normal, the atomic weight of hydrogen being taken as 1. The above fraction may be written as $1\times10^{-7}$ and since there is one hydroxyl ion formed for each hydrogen ion the concentration of the hydroxyl ions must also be equal to $1\times10^{-7}$. According to the mass law the concentration of the hydrogen ions (H) multiplied by the concentration of the hydroxyl ions (OH) equals the concentration of water ($H_2O$) multiplied by a constant (K). The concentration of the water may be considered constant and the equation appears as follows: $H\times OH=K$. The value of K at normal temperature is approximately $1\times10^{-14}$. Thus the equation will read $H\times OH=1\times10^{-14}$. When acids or acid salts are added to the water there is an increase in the number of hydrogen ions, and since the mass law holds under this condition there is a proportional decrease in the number of hydroxyl ions. The reverse is true when alkalis or alkaline salts are added to the water. From this it will be seen that the change from an acid to an alkaline reaction, or vice versa, is gradual and effects a corresponding change in the concentration of the hydrogen ions so that the actual reaction of any solution either acid or alkaline may be indicated by giving the concentration of the hydrogen ions. A solution, the actual reaction of which is neutral, contains $1\times10^{-7}$ grams of hydrogen ions per liter, and a solution, the reaction of which is normal alkaline, contains $1\times10^{-14}$ grams of hydrogen ions per liter.

Referring to the accompanying drawings, the opposite poles of a battery 1 are connected through a circuit 2 with a series of resistances 5, 6 and 7. The resistance 6 comprises a straight wire or other construction for securing a uniform drop in potential throughout the length of the resistance, and is provided with a sliding contact 10 which is connected with the positive pole of the battery 1 through two shunt circuits, indicated at 11 and 12. The circuit 12 includes a volt meter 13 and the circuit 11 includes a calomel electrode 15, the solution to be measured contained in a beaker 16, a hydrogen electrode 17 and a quadrant electrometer 18. Through the provision of a switch 19 and a shunt circuit 20 the quadrant electrometer may be cut in or out of the circuit 11 as desired. It will be obvious that, upon closing a switch 21 contained in the circuit 2, a current will flow from the battery through the resistances 5, 6 and 7 and the drop in potential between the positive pole of the battery and the movable contact 10 will be measured by the volt meter 13. The solution to be measured in conjunction with the hydrogen and calomel electrodes forms a battery having a potential drop dependent upon the concentration of the hydrogen ions, and in order to measure this potential accurately the battery thus formed is balanced against the battery 1. To this end the switch 10 is first manipulated to short circuit the electrometer 18, thus causing both quadrants of the latter to take the same potential and the needle of the electrometer to come to a position of rest. The position of the needle may be determined in any convenient manner as by causing a spot of light, reflected from the mirror on the needle, to play over a suitable scale in a well known manner. The position of this spot of light when the needle is at rest is known, and may be termed the "zero" position of the needle. The switch 19 is then manipulated to include the electrometer in the circuit 11 and the quadrants of the electrometer thus connected with the hydrogen electrode become charged to a potential dependent upon the hydrogen ion concentration of the solution in the beaker, causing the needle of the electrometer to assume a new position. By suitably manipulating the contact 10 and thus varying the resistance 6, it is possible, if the resistances 5 and 7 are properly adjusted, to determine accurately at what point along the resistance 6 the drop in potential, due to the battery 1, balances the drop in potential due to the battery formed by the hydrogen and calomel electrodes. This point along the resistance 6 is determined by adjusting the movable contact 10 until the needle of the quadrant electrometer is returned to the initial or zero position.

In order to cause the apparatus to measure the changes in potential directly in terms of the hydrogen ion concentration of the solution, a scale 25 is associated with the resistance 6. The ordinates of the scale are divided into fourteen divisions in order to afford the proper range in reactions of the solutions from normal acid to normal alkali in accordance with the formula hereinbefore set forth. Each of the fourteen main divisions is subdivided according to a logarithmic scale so that the variations in potential, as determined by the position of the movable pointer, will be measured directly upon the scale as hydrogen ions in terms of normal solutions. The effective length of the resistance 6 corresponds to the length of the scale which is retained in predetermined relation thereto. In the illustrated embodiment of the invention it has been found convenient to provide means whereby the curve produced by varying reactions of a solution may be plotted directly. To this end the scale is made in rectangular form with the ordinates as previously described and the abscissæ uniformly spaced from one another and denoting equal volumes, periods of time, or other desired data. The scale is supported upon parallel guides 26 which retain the scale against longitudinal movement relative to the resistance but permit movements of the scale at right angles thereto. In order to cause the changes in the reaction of the solution to be recorded, the movable contact may conveniently be provided with any suitable type of printing or registering mechanism 27 which, when manipulated, plots the concentration point upon the scale. In Fig. 2 is illustrated a detail of a device for recording the position of the movable contact 10 with relation to the scale which comprises a spring pressed plunger 29 which is positioned above the paper and may be depressed into engagement therewith.

In order to avoid the necessity of employing a battery in the main circuit having a standard potential, with the disadvantages attendant to the use of such a battery, the variable resistances 5 and 7 are included in the main circuit 2 in series with the resistance 6. By suitably adjusting these resistances variations in the electromotive force of the battery 1 may be compensated for and a constant drop in potential obtained. To this end the movable contact 10 is first set at the left hand end of the scale and the resistance 5 adjusted until the volt meter indicates the proper voltage for that end of the scale as determined by mathematical formulæ. The contact is then moved to a position opposite one of the main divisions at the opposite end of the scale and the resistance 7 is adjusted until the volt meter indicates the proper reading for that portion of the scale, as also determined by well known formulæ. It will thus be obvious that, owing to the provision of these resistances, the drop in potential along the scale may be maintained constant independently of the electromotive force of the battery.

The hydrogen and calomel electrodes which are employed have not been described for the reason that these electrodes form no part specifically of the present invention and their construction and operation is well known to those skilled in the art.

The invention having been described, what is claimed is:

1. An apparatus for measuring the concentration of ions in solution, having a main electrical circuit including a source of electromotive force and a resistance in series therewith, a movable contact coöperating with the resistance, a shunt circuit connecting the main circuit with the movable contact and including the solution to be measured, electrodes in the solution whose difference in potential depends upon the concentration of ions in the solution and a potential indicator, and a scale located in a predetermined position with relation to the resistance and uniformly divided into a plurality of main divisions, each of which is subdivided logarithmically to cause the position of the movable contact relative to the scale to be read in terms of the ionic concentration of the solution.

2. An apparatus for measuring the concentration of ions in solution, having a main electrical circuit including a source of electromotive force and a resistance in series therewith, a movable contact coöperating with the resistance, a shunt circuit connecting the main circuit with the movable contact and including the solution to be measured, electrodes in the solution whose difference in potential depends upon the concentration of ions in the solution and a potential indicator, and a scale associated with the resistance and divided into fourteen main divisions, each of which is subdivided logarithmically to cause the position of the contact relative to the scale to be read in terms of the ionic concentration of the solution.

3. An apparatus for measuring the concentration of ions in solution, having a main electrical circuit including a source of electromotive force and a resistance in series therewith, a shunt circuit including a movable contact coöperating with the resistance, the solution to be measured and a pair of electrodes in the solution whose difference in potential depends upon the reaction of the solution, means for determining when the two circuits have the same potential drop, and a scale associated with the resistance and divided uniformly into a plurality of main divisions, each of which is subdivided logarithmically to enable the position of the contact to be read directly in terms of the ionic concentration of the solution.

4. An apparatus for measuring the concentration of ions in solution, having a main electrical circuit including a source of electromotive force and a resistance in series therewith, a shunt circuit including the solution to be measured, a pair of electrodes in the solution whose difference in potential depends upon the concentration of ions in the solution and a movable contact coöperating with the resistance, a scale associated with the resistance and having ordinates arranged to provide a plurality of equal main divisions subdivided logarithmically, and abscissæ arranged to form a plurality of equal divisions.

5. An apparatus for measuring the concentration of ions in solution, having a main electrical circuit including a source of electromotive force and a resistance in series therewith, a shunt circuit including the solution to be measured, a pair of electrodes in the solution whose difference in potential depends upon the concentration of ions in the solution and a movable contact coöperating with the resistance, a scale associated with the resistance and having ordinates arranged to form a plurality of equal divisions subdivided logarithmically, and abscissæ arranged to form a plurality of equal divisions, and means for recording upon the scale the position of the movable contact relative thereto.

WILLIAM T. BOVIE.